US012584596B2

(12) United States Patent
Wu et al.

(10) Patent No.: US 12,584,596 B2
(45) Date of Patent: Mar. 24, 2026

(54) GLASS LAMP WITH SWITCH

(71) Applicant: Xiamen Topstar Lighting Co., Ltd., Xiamen (CN)

(72) Inventors: Yongjie Wu, Xiamen (CN); Yunbiao Wu, Xiamen (CN); Xiaoyan Zhong, Xiamen (CN); Yebiao Huang, Xiamen (CN)

(73) Assignee: Xiamen Topstar Lighting Co., Ltd., Xiamen (CN)

( * ) Notice: Subject to any disclaimer, the term of this patent is extended or adjusted under 35 U.S.C. 154(b) by 0 days.

(21) Appl. No.: 19/064,914

(22) Filed: Feb. 27, 2025

(65) Prior Publication Data

US 2025/0243976 A1 Jul. 31, 2025

(51) Int. Cl.

| | |
|---|---|
| ***F21K 9/238*** | (2016.01) |
| ***F21V 23/04*** | (2006.01) |
| ***F21V 29/70*** | (2015.01) |

(52) U.S. Cl.
CPC .............. *F21K 9/238* (2016.08); *F21V 23/04* (2013.01); *F21V 29/70* (2015.01)

(58) Field of Classification Search
CPC ...... F21V 29/70; F21V 23/04; F21V 23/0428; F21K 9/238
See application file for complete search history.

(56) References Cited

FOREIGN PATENT DOCUMENTS

| | | | | |
|---|---|---|---|---|
| CN | 210511114 U | * | 5/2020 | ............. F21K 9/233 |
| CN | 111878772 A | * | 11/2020 | .............. F21V 23/04 |
| CN | 116347693 A | * | 6/2023 | ............. H05B 45/10 |
| KR | 102571168 B1 | * | 8/2023 | .......... F21V 33/0064 |

OTHER PUBLICATIONS

Innovation Q+ NPL Search (Year: 2025).*

* cited by examiner

*Primary Examiner* — Anabel Ton
(74) *Attorney, Agent, or Firm* — Westbridge IP LLC

(57) ABSTRACT

A glass lamp with a switch includes a glass shell, a light-transmitting assembly, a light source plate and a switch element. The light source plate and the switch element are arranged in the glass shell; the light-transmitting assembly is arranged on one side of a light-emitting surface of the light source plate; the light-transmitting assembly is provided with a through hole; a signal end of the switch element is connected with a driving circuit arranged in the glass shell; and an operating end of the switch element is arranged at the position of the through hole. The present application solves the problem that a mechanical switch cannot be arranged in the shell of the glass lamp due to the material or structure, and meets the user need for multifunctional control of the glass lamp through the mechanical switch.

13 Claims, 4 Drawing Sheets

GLASS LAMP WITH SWITCH

TECHNICAL FIELD

The present application relates to the technical field of glass lamps, in particular to a glass lamp with a switch.

BACKGROUND

At present, a multifunctional LED lamp has become an industry design trend. However, the traditional glass LED lamp product makes the LED lamp wall thicker and results in the inability to arrange a switch fixing structure on the side wall of the lamp because the product shell adopts a glass structure. Therefore, at present, it is difficult to achieve multifunctional control of the glass LED lamp product through mechanical switches. The statements herein provide background information only related to the present application and do not necessarily constitute the prior art.

SUMMARY

A glass lamp with a switch includes a glass shell, a light-transmitting assembly, a light source plate and a switch element; the light source plate and the switch element are arranged in the glass shell; the light-transmitting assembly is arranged on one side of a light-emitting surface of the light source plate; the light-transmitting assembly is provided with a through hole; a signal end of the switch element is connected with a driving circuit arranged in the glass shell; and an operating end of the switch element is arranged at the position of the through hole.

DETAILED DESCRIPTION OF THE EMBODIMENTS

Figure 1:
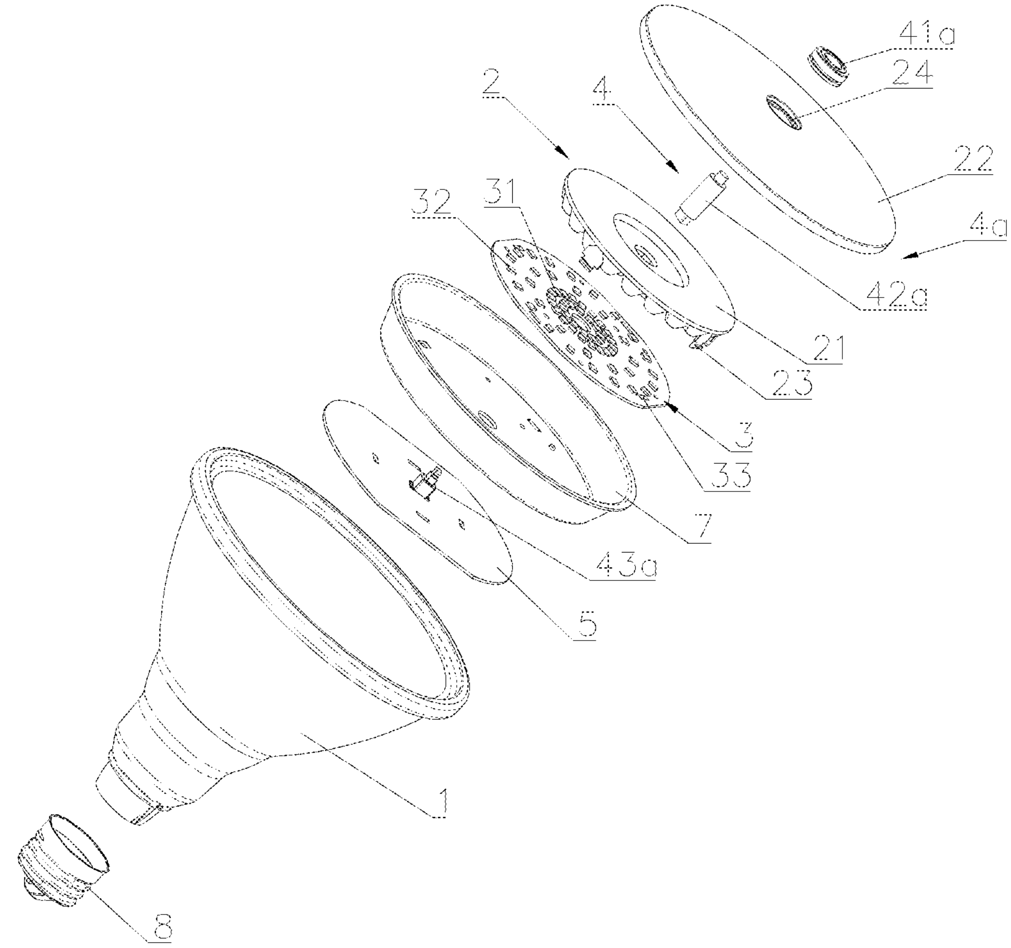
FIG. 1 is an exploded view of a glass lamp with a switch according to one or more embodiments.

To explain the technical content, achieved purposes and effects of the present application in detail, the present application is illustrated below in combination with the implementation modes and the drawings.

A glass lamp with a switch includes a glass shell, a light-transmitting assembly, a light source plate and a switch element; the light source plate and the switch element are arranged in the glass shell; the light-transmitting assembly is arranged on one side of a light-emitting surface of the light source plate; the light-transmitting assembly is provided with a through hole; a signal end of the switch element is connected with a driving circuit arranged in the glass shell; and an operating end of the switch element is arranged at the position of the through hole.

It can be seen from the above description that the beneficial effects of the present application are: the light source plate and the switch element are arranged in the glass shell, the light-transmitting assembly is covered on the top of the glass shell, and the light-transmitting assembly is provided with the through hole, so that the switch end of the switch element is exposed from the position of the through hole. Thus, the user switches the function of the glass lamp through the exposed switch end, which solves the problem that a mechanical switch cannot be arranged in the shell of the glass lamp due to the material or structure, and meets the user need for multifunctional control of the glass lamp through the mechanical switch.

In some embodiments, the switch element includes a button dial switch or a rotating dial switch.

It can be seen from the above description that the button dial switch or the rotating dial switch or other structures are used as the switch elements to meet the design needs for different switch control modes under different scenarios.

In some embodiments, the button dial switch includes a button element, a guide column and a button self-locking switch; the button self-locking switch is used for being connected with the driving circuit; one end of the guide column is connected with the button self-locking switch; the other end of the guide column penetrates through the light-transmitting assembly and is connected with the button element; and the button element is arranged correspondingly to the position of the through hole.

It can be seen from the above description that the button dial switch is formed by the button element, the guide column and the button self-locking switch. After a pressing signal of the button element is received through the guide column, the pressing signal is further transferred to the button self-locking switch; then the state of the button self-locking switch is switched; and circuit parameters are controlled by the driving circuit according to the state of the button self-locking switch to realize the adjustment of functions of power, color temperature, etc.

In some embodiments, the button element is a waterproof button.

It can be seen from the above description that the waterproof button is used as the button element, which improves the waterproof performance of the lamp.

In some embodiments, the rotating dial switch includes a rotating dial element, a rack and a gear dial switch; a rotating dial end of the rotating dial element is arranged at the position of the through hole; a rotating tooth end of the rotating dial element penetrates through the light-transmitting assembly and is engaged with the rack; the rack is connected with the dial end of the gear dial switch; and the gear dial switch is used for being connected with the driving circuit.

It can be seen from the above description that the rotating dial switch is formed by the rotating dial element, the rack and the gear dial switch. After the rotating dial element rotates, the rack is driven to move and then the dial end of the gear dial switch moves through the rack to realize the switching of different gears. Thus, the driving circuit controls the circuit parameters according to the gear state to realize the adjustment of functions of power, color temperature, etc.

In some embodiments, the rotating dial end of the rotating dial element is provided with a waterproof rubber ring.

It can be seen from the above description that the waterproof performance of the lamp is improved by arranging the waterproof rubber ring on the rotating dial end of the rotating dial element.

In some embodiments, the glass clamp further includes a driving plate; the driving plate is used for arranging the driving circuit; the gear dial switch is arranged on the driving plate; the driving plate is arranged on one side of the light source plate away from the light-transmitting assembly; and the other end of the rotating dial element penetrates through the light-transmitting assembly and the light source plate successively and is engaged with the rack.

It can be seen from the above description that the driving plate is arranged, and the driving circuit and the gear dial switch are arranged on the driving plate so that the stability of the driving circuit and the gear dial switch is improved.

In some embodiments, the glass clamp further includes a fixing element; the fixing element is arranged between the light source plate and the driving plate; and the rack is movably arranged on one side of the fixing element close to the light source plate.

It can be seen from the above description that the fixing element is arranged between the light source plate and the driving plate and the rack is arranged in the fixing element so that the stability of connection between the light source plate and the driving plate is improved and the stability of the rack during movement is improved.

In some embodiments, the light source plate is provided with an inner ring light source and an outer ring light source; the inner ring light source is arranged around the center of the light source plate; and the outer ring light source is arranged around the inner ring light source.

It can be seen from the above description that the inner ring light source and the outer ring light source are arranged on the light source plate, so that different luminous forms are formed based on the distribution of the inner ring light source and the outer ring light source, e.g. forming different luminous angles, etc. to achieve different lighting effects.

In some embodiments, the light-transmitting assembly includes a lens and a light-transmitting hood; the light-transmitting hood is covered on the top of the glass shell; the lens is arranged on the light source plate; an area corresponding to the inner ring light source on the lens is provided with a small-angle sub-lens; and an area corresponding to the outer ring light source is provided with a large-angle sub-lens.

It can be seen from the above description that the arranged lens and light-transmitting hood not only play a role of protecting the light source, but also improve the light transmittance of the light source through the lens.

In some embodiments, one side of the lens close to the light source plate is provided with a buckle; and the light source plate is provided with a clamping groove connected with the buckle.

It can be seen from the above description that by arranging the buckle on the lens and correspondingly arranging the clamping groove on the light source plate, the stability of connection between the lens and the light source plate is improved based on the coordination of the clamping groove and the buckle.

In some embodiments, the glass clamp further includes a heat dissipation element; the heat dissipation element is erected in the glass shell; and one side of the light source plate away from the light-transmitting assembly is fitted with the heat dissipation element.

It can be seen from the above description that the light source plate is fitted with the heat dissipation element, so as to improve the heat dissipation effect of the light source plate through the heat dissipation element.

The glass lamp with the switch provided in the present application is mainly applied to the scenarios of the glass lamp, which is explained below through specific implementation modes.

In at least one embodiment, a glass lamp with a switch includes a glass shell 1, a light-transmitting assembly 2, a light source plate 3 and a switch element 4; the light source plate 3 and the switch element 4 are arranged in the glass shell 1; the light-transmitting assembly 2 is arranged on one side of a light-emitting surface of the light source plate 3; the light-transmitting assembly 2 is provided with a through hole 24; a signal end of the switch element 4 is connected with a driving circuit arranged in the glass shell 1; and an operating end of the switch element 4 is arranged at the position of the through hole 24. The bottom of the glass shell 1 is provided with a lamp cap 8. Wherein the switch element 4 is not limited to include a button dial switch 4*a* or a rotating dial switch 4*b*, and the form of the dial switch is not limited to horizontal dial or rotating dial. In some embodiments, the glass lamp further includes a driving plate 5; the driving plate 5 is arranged on one side of the light source plate 3 away from the light-transmitting assembly 2; and the driving circuit is arranged on the light source plate 3 or the driving plate 5. When the driving circuit is arranged on the light source plate 3, the signal end of the switch element 4 is arranged on the light source plate 3 and is used for being connected with the driving circuit. When the driving circuit is arranged on the driving plate 5, the signal end of the switch element 4 penetrates through the light source plate 3 and is used for being connected with the driving circuit on the driving plate 5; and the driving plate 5 is connected with the light source plate 3 through a cable or a terminal.

Figure 2:
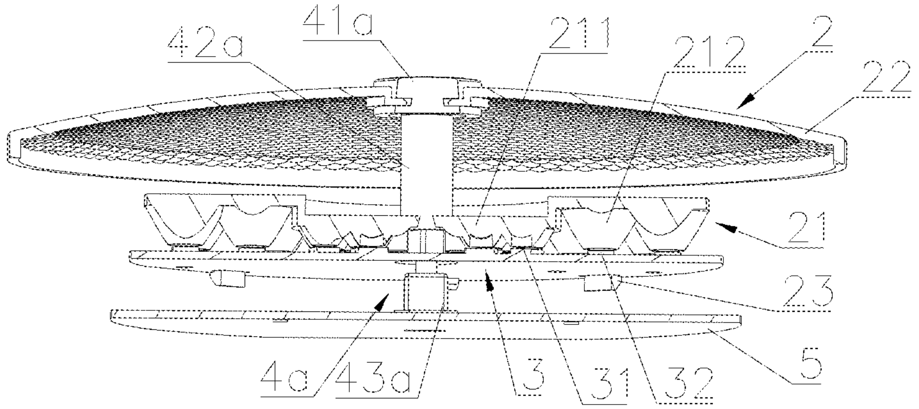
FIG. 2 is an assembly schematic diagram of a button dial switch according to one or more embodiments.

By referring to FIG. 1 and FIG. 2, in some embodiments, the button dial switch 4*a* includes a button element 41*a*, a guide column 42*a*, and a button self-locking switch 43*a*; the button self-locking switch 43*a* is used for being connected with the driving circuit; one end of the guide column 42*a* is connected with the button self-locking switch 43*a*; the other end of the guide column 42*a* penetrates through the light-transmitting assembly 2 and is connected with the button element 41*a*; and the button element 41*a* is arranged correspondingly to the position of the through hole 24. Wherein the button element 41*a* is a waterproof button, e.g., made of silicone material, to achieve the waterproof design need for the light-emitting surface.

As shown in FIG. 1, the button self-locking switch 43*a* is placed on the driving plate 5 at the bottom of the light source plate 3, and the guide column 42*a* presses the button self-locking switch 43*a* by pressing the button element 41*a*, to achieve the adjustment function. The small-size guide column 42*a* and the button element 41*a* are adopted to minimize the influence of the switch element 4 on the light-emitting surface; and the switch element 4 is arranged in the central position, so that the switch element 4 has no effect on the arrangement of the light source on the light source plate 3, so as to realize the arrangement of two rings of LED light sources inside and outside, and realize the adjustment of the light-emitting angle with the coordination of the lens of different light-emitting angles inside and outside. For example, the switch element 4 is used for adjusting the color temperature function: the default warm color temperature is switched to cool color temperature, after the switch element 4 is pressed, to achieve the switching of two color temperatures; the switch element 4 is used for adjusting the power function: a default low power gear is switched to a high power gear after the switch element 4 is pressed, to achieve the switching of two powers; and the switch element 4 is used for adjusting the light-emitting angle function: in a default bright inner ring light source 31, light is emitted from the inner ring small-angle lens; and after the switch element 4 is pressed, the outer ring light source 32 is lit, and the light is emitted from the outer ring large-angle lens, to achieve the switching of two light-emitting angles.

Figure 3:
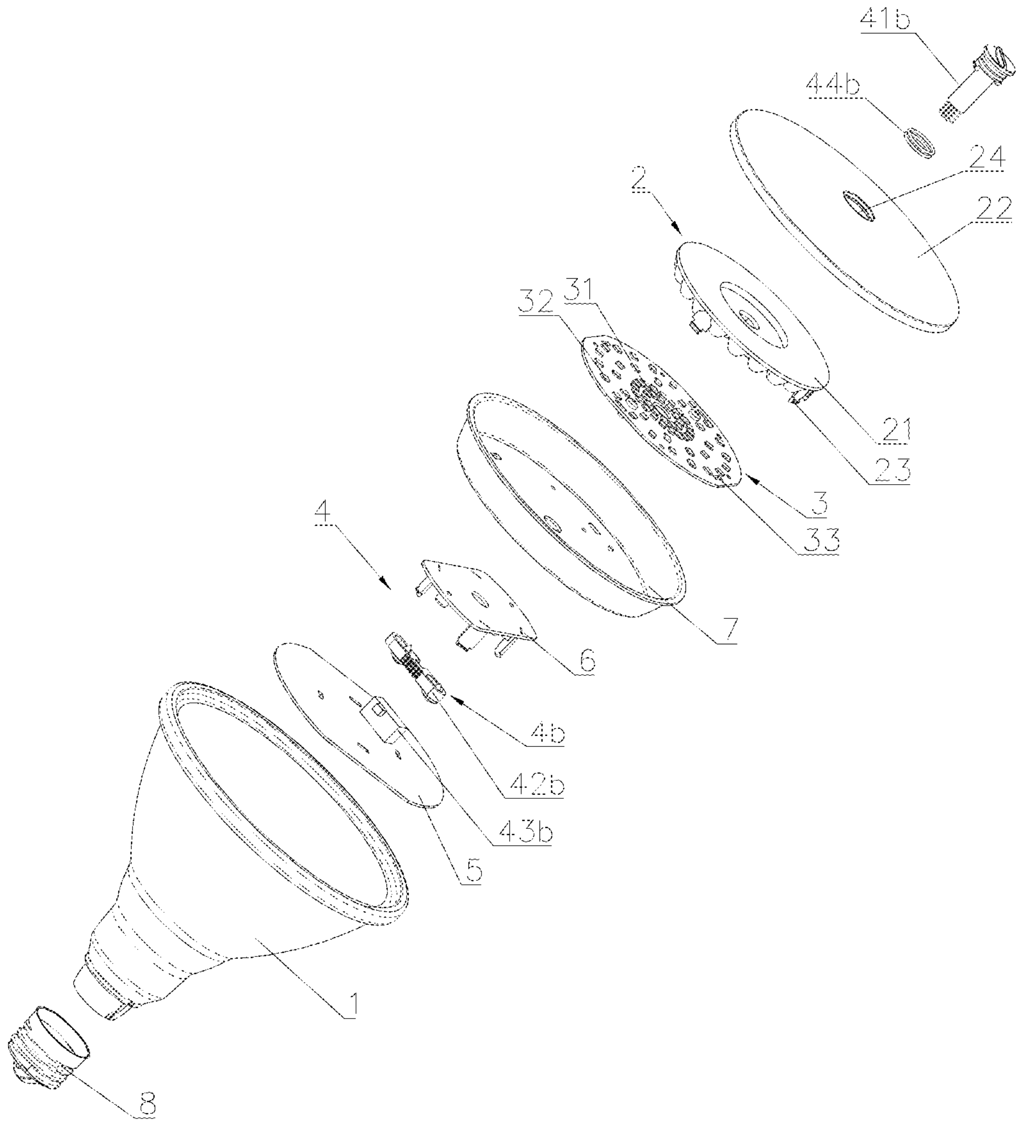
FIG. 3 is an exploded view of another glass lamp with a switch according to one or more embodiments.
Figure 4:
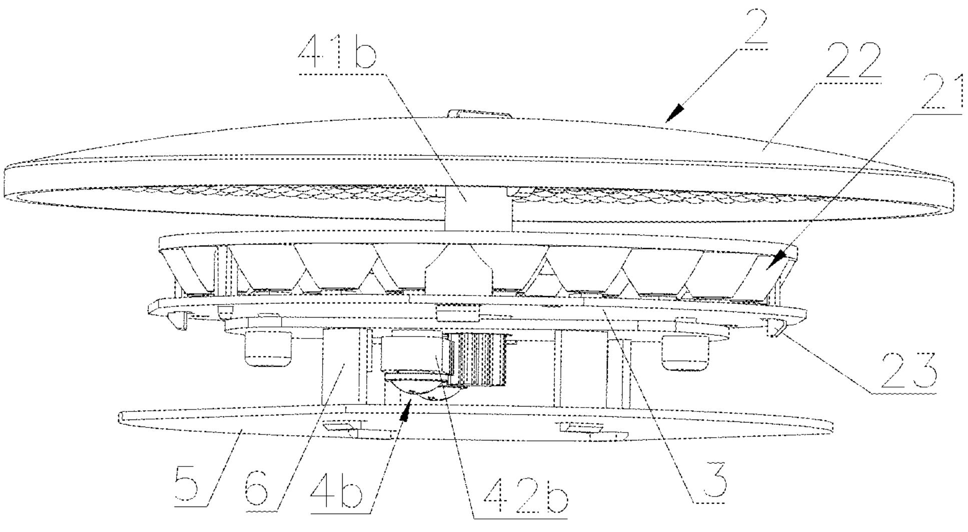
FIG. 4 is an assembly schematic diagram of a rotating dial switch according to one or more embodiments.
Figure 5:
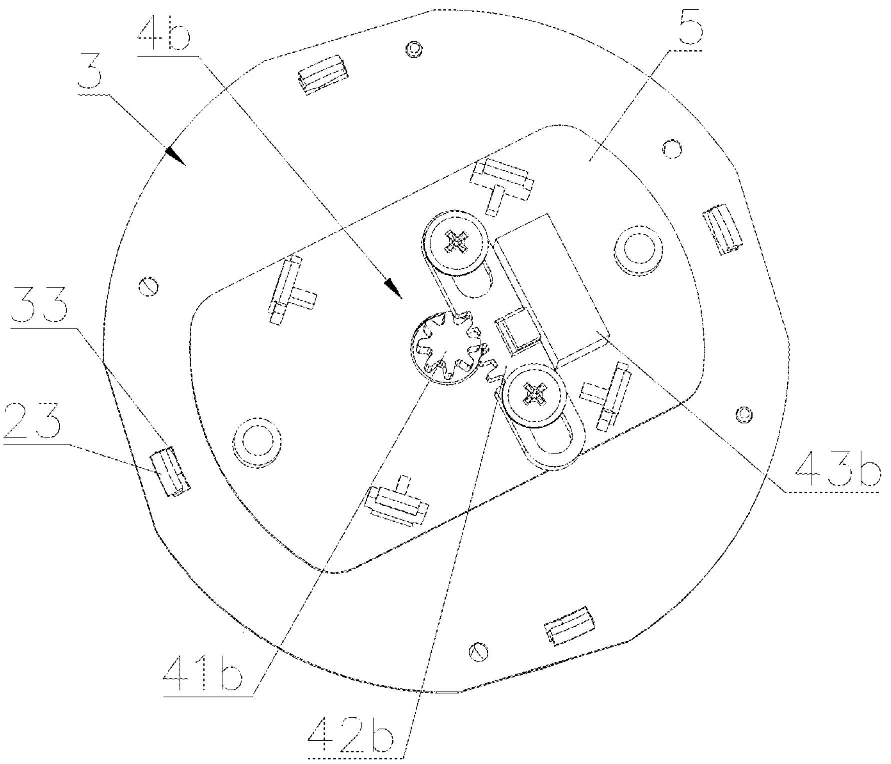
FIG. 5 is an assembly top view of a rotating dial switch according to one or more embodiments.

By referring to FIG. 3 to FIG. 5, in some other embodiments, the rotating dial switch 4*b* includes a rotating dial element 41*b*, a rack 42*b*, and a gear dial switch 43*b*; a rotating dial end of the rotating dial element 41*b* is arranged at the position of the through hole 24; the rack 42*b* is connected with the dial end of the gear dial switch 43*b*; the driving circuit and the gear dial switch 43*b* are arranged on the driving plate 5; the rotating tooth end of the rotating dial element 41*b* penetrates through the light-transmitting assembly 2 and the light source plate 3 successively and is engaged with the rack 42*b*; and the gear dial switch 43*b* is used for being connected with the driving circuit. The rotating dial end of the rotating dial element 41*b* is provided with a waterproof rubber ring 44*b*. Wherein the glass clamp further includes a fixing element 6; the fixing element 6 is arranged between the light source plate 3 and the driving plate 5; and the rack 42*b* is movably arranged on one side of the fixing element 6 close to the light source plate 3.

As shown in FIG. 5, one side of the rack 42*b* is engaged with the rotating dial element 41*b*, and the other side of the rack 42*b* is provided with a groove for placing the dial end of the gear dial switch 43*b*. The rack 42*b* is provided with slots at both ends along a moving direction, and the rack 42*b* is installed on the fixing element 6 by penetrating a screw through the slots, that is, the screw is fixedly connected with the fixing element 6. The rack 42*b* is movably connected with the screw through the slots. The movable distance of the rack 42*b* is the length of the slots.

In some embodiments, the gear dial switch 43*b* is arranged on the driving plate 5, and the driving plate 5 adopts an aluminum substrate, a glass fiber board or a plate of other components. By rotating the rotating dial element 41*b*, the rack 42*b* is driven to move, and then the rack 42*b* moves the dial end of the gear dial switch 43*b* to realize the switching of different gears. For example, the switch element 4 is used for adjusting the color temperature function: the multi-gear rotating dial switch 4*b* corresponds to different color temperatures, to dial to a designated gear corresponding to the designated color temperature, to achieve multi-color temperature switching. The switch element 4 is used for adjusting the power function: the multi-gear rotating dial switch 4*b* corresponds to the power, to dial to a designated gear corresponding to the designated power, to achieve multi-power switching. The switch element 4 is used for adjusting the light-emitting angle function: the multi-gear rotating dial switch 4*b* is matched to achieve that at gear 1, the inner ring light source 31 is lit, the outer ring light source 32 is not bright, and the light is emitted from the inner ring small-angle lens; at gear 2, the inner ring light source 31 is extinguished, the outer ring light source 32 is lit, and the light is emitted from the outer ring large-angle lens; and at gear 3, the inner ring light source 31 and the outer ring light source 32 are lit at the same time to form a mixed angle of large and small angles, i.e., the light is emitted at a middle angle, to achieve the switching of multiple light-emitting angles. Wherein the function of the switch is not limited to the adjustment of the light-emitting angles, the power and the color temperature. The number of switches and the placement position on the light-emitting surface are adjusted according to the actual design needs, and when the switch is arranged, it is necessary to minimize the influence on the light-emitting surface to avoid affecting the light-emitting effect. The implementation mode of the switch can be extended to other lamps made of non-glass shell 1.

In some embodiments, as shown in FIG. 1 and FIG. 3, the light source plate 3 is provided with an inner ring light source 31 and an outer ring light source 32; the inner ring light source 31 is arranged around the center of the light source plate 3; and the outer ring light source 32 is arranged around the inner ring light source 31. The light-transmitting assembly 2 includes a lens 21 and a light-transmitting hood 22; the light-transmitting hood 22 is covered on the top of the glass shell 1; and the lens 21 is arranged on the light source plate 3. In some embodiments, an area corresponding to the inner ring light source 31 on the lens 21 is an area capable of receiving the inner ring light source 31 on the lens; and an area corresponding to the outer ring light source 32 on the lens 21 is an area capable of receiving the outer ring light source 32 on the lens. Specifically, an area corresponding to the inner ring light source 31 on the lens 21 is provided with a small-angle sub-lens 211; and an area corresponding to the outer ring light source 32 is provided with a large-angle sub-lens 212. At the same time, one side of the lens 21 close to the light source plate 3 is provided with a buckle 23; and the light source plate 3 is provided with a clamping groove 33 connected with the buckle 23. The glass clamp further includes a heat dissipation element 7; the heat dissipation element 7 is erected in the glass shell 1; and one side of the light source plate 3 away from the light-transmitting assembly 2 is fitted with the heat dissipation element 7.

To sum up, in the glass lamp with the switch provided in the present application, the light source plate, the driving circuit and the switch element are arranged in the glass shell, the light-transmitting assembly is covered on the top of the glass shell, and the light-transmitting assembly is provided with the through hole, so that the switch end of the switch element is exposed from the position of the through hole. Thus, the user switches the function of the glass lamp through the exposed switch end, which solves the problem that a mechanical switch cannot be arranged in the shell of the glass lamp due to the material or structure, and meets the user need for multifunctional control of the glass lamp through the mechanical switch. Moreover, the switch element has the waterproof assembly, which improves the tightness of the lamp; and the light source plate adopts the design of the inner and the outer light sources, which improves the lighting effect of the lamp.

The above only describes embodiments of the present application, and is not intended to limit the scope of the patent of the present application. Any equivalent transformation made by using the contents of the description and drawings of the present application and directly or indirectly used in the relevant technical fields is similarly included in the protection scope of the patent of the present application.

What is claimed is:

1. A glass lamp with a switch, comprising a glass shell, a light-transmitting assembly, a light source plate and a switch element; wherein the light source plate and the switch element are arranged in the glass shell;

the light-transmitting assembly is arranged on one side of a light-emitting surface of the light source plate;

the light-transmitting assembly is provided with a through hole;

a signal end of the switch element is connected with a driving circuit arranged in the glass shell; and an operating end of the switch element is arranged at a position of the through hole.

2. The glass lamp with the switch according to claim 1, wherein the switch element comprises a button dial switch or a rotating dial switch.

3. The glass lamp with the switch according to claim 2, wherein the button dial switch comprises a button element, a guide column and a button self-locking switch;

the button self-locking switch is used for being connected with the driving circuit;

one end of the guide column is connected with the button self-locking switch;

the other end of the guide column penetrates through the light-transmitting assembly and is connected with the button element; and the button element is arranged correspondingly to the position of the through hole.

4. The glass lamp with the switch according to claim 3, wherein the button element is a waterproof button.

5. The glass lamp with the switch according to claim 2, wherein the rotating dial switch comprises a rotating dial element, a rack and a gear dial switch;

a rotating dial end of the rotating dial element is arranged at the position of the through hole;

a rotating tooth end of the rotating dial element penetrates through the light-transmitting assembly and is engaged with the rack;

the rack is connected with the dial end of the gear dial switch; and the gear dial switch is used for being connected with the driving circuit.

6. The glass lamp with the switch according to claim 5, wherein the rotating dial end of the rotating dial element is provided with a waterproof rubber ring.

7. The glass lamp with the switch according to claim 5, further comprising a driving plate, wherein the driving plate is used for arranging the driving circuit;

the gear dial switch is arranged on the driving plate;

the driving plate is arranged on one side of the light source plate away from the light-transmitting assembly; and the other end of the rotating dial element penetrates through the light-transmitting assembly and the light source plate successively and is engaged with the rack.

8. The glass lamp with the switch according to claim 7, further comprising a fixing element, wherein the fixing element is arranged between the light source plate and the driving plate; and the rack is movably arranged on one side of the fixing element close to the light source plate.

9. The glass lamp with the switch according to claim 1, wherein the light source plate is provided with an inner ring light source and an outer ring light source;

the inner ring light source is arranged around a center of the light source plate; and the outer ring light source is arranged around the inner ring light source.

10. The glass lamp with the switch according to claim 9, wherein the light-transmitting assembly comprises a lens and a light-transmitting hood;

the light-transmitting hood is covered on the top of the glass shell; and the lens is arranged on the light source plate.

11. The glass lamp with the switch according to claim 10, wherein an area corresponding to the inner ring light source on the lens is provided with a small-angle sub-lens, and an area corresponding to the outer ring light source is provided with a large-angle sub-lens.

12. The glass lamp with the switch according to claim 10, wherein one side of the lens close to the light source plate is provided with a buckle; and the light source plate is provided with a clamping groove connected with the buckle.

13. The glass lamp with the switch according to claim 1, further comprising a heat dissipation element, wherein the heat dissipation element is erected in the glass shell; and one side of the light source plate away from the light-transmitting assembly is fitted with the heat dissipation element.

* * * * *